US008527479B2

(12) United States Patent
Ghatty et al.

(10) Patent No.: US 8,527,479 B2
(45) Date of Patent: Sep. 3, 2013

(54) DETERMINING WHETHER A SELECTED BACKUP SET SATISFIES A RETENTION POLICY

(75) Inventors: Surya K. Ghatty, Rochester, MN (US); James P. Smith, Redwood City, CA (US); Peter B. Symonds, Portola Valley, CA (US); William R. Yonker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/333,400

(22) Filed: Dec. 21, 2011

(65) Prior Publication Data

US 2013/0166521 A1 Jun. 27, 2013

(51) Int. Cl.
*G06F 7/00* (2006.01)

(52) U.S. Cl.
USPC .......................................................... 707/695

(58) Field of Classification Search
USPC ......................................... 707/695, 680, 639
See application file for complete search history.

(56) References Cited

U.S. PATENT DOCUMENTS

| 7,478,117 B1 | 1/2009 | Lanb et al. | |
| 7,809,691 B1 | 10/2010 | Karmarkar et al. | |
| 8,185,505 B1 * | 5/2012 | Blitzer et al. | 707/679 |
| 2003/0182301 A1 * | 9/2003 | Patterson et al. | 707/102 |
| 2006/0288183 A1 | 12/2006 | Boaz et al. | |
| 2007/0136381 A1 * | 6/2007 | Cannon et al. | 707/200 |
| 2008/0276123 A1 | 11/2008 | Sudhakar et al. | |
| 2009/0070626 A1 | 3/2009 | Chen et al. | |
| 2009/0222496 A1 | 9/2009 | Liu et al. | |
| 2009/0313626 A1 | 12/2009 | Dawson et al. | |
| 2010/0121819 A1 * | 5/2010 | Lazzaro et al. | 707/640 |
| 2010/0257346 A1 | 10/2010 | Sosnosky et al. | |
| 2011/0173404 A1 | 7/2011 | Eastman et al. | |
| 2011/0173405 A1 | 7/2011 | Grabarnik et al. | |
| 2011/0185223 A1 | 7/2011 | Kleinman et al. | |
| 2013/0024423 A1 * | 1/2013 | Doshi et al. | 707/640 |

OTHER PUBLICATIONS

IBM Tivoli Storage Management Concepts by Charlotte Brooks, Peter McFarlane, Norbert Pott, Martin Troka, Eduardo Tomaz, Copyright IBM Corp. 1997, 2000, 2003, 2006, Chapter 6 Backup-Archive client.*
IBM Tivoli Storage Manager: A Technical Introduction, Andy Wharton Roland Leins Charlotte Brooks, Copyright 2003.*

(Continued)

*Primary Examiner* — Kimberly Wilson
*Assistant Examiner* — Hau H Hoang
(74) *Attorney, Agent, or Firm* — David W. Victor; Konrad, Raynes, Davda & Victor LLP (57) ABSTRACT

Provided are computer program product, system, and method for assessing a backup image comprising a backup of a source computer system to recover to a target computer system. A point-in-time backup image is selected from a plurality of backup images taken of an image on the source computer system, wherein the selected backup is to be applied to the target computer system. A determination is made from a plurality of retention policies applicable to files included in the source computer system a most restrictive retention policy. A determination is made as to whether the selected backup image satisfies the most restrictive retention policy. A retention status of the backup image is set based on whether the determined version of the selected backup satisfies the most restrictive retention policy. The retention status is presented for use in determining whether to use the selected backup image.

24 Claims, 6 Drawing Sheets

(56) References Cited

OTHER PUBLICATIONS

Oracle Database Backup and Recovery Advanced User'Guide 10g Release 2 (10.2) B 14191-02, Nov. 2005.*

Weiss et al., "Traceable Quantitative Risk Assessment Applied to Investment Decision for Local Backups", The Third Conference on Availability, Reliability and Security, 2008, pp. 1-18.

"Recovery and Its Quality on Multilayer Networks", Journal of Lightwave Technology, vol. 28, No. 4, dated Feb. 15, 2010, pp. 1-18.

Kadleck et al., "IBM Tivoli Storage Manager: Bare Machine Recovery for Windows with Cristie BMR", IBM International Technical Support Organization, dated Oct. 2003, pp. 1-104.

Application entitled, "Determining an Overall Assessment of a Likelihood of a Backup Set Resulting in a Successful Restore", Filed Dec. 20, 2011, by Inventors S. Ghatty, J. Smith, P. Symonds, and W. Yonker.

* cited by examiner

FIG. 1

FIG. 2 Backup Image

FIG. 3 Backup Image Metadata

FIG. 4 File Metadata

FIG. 5 Include List

DETERMINING WHETHER A SELECTED BACKUP SET SATISFIES A RETENTION POLICY

BACKGROUND OF THE INVENTION

1. Field of the Invention

The present invention relates to a computer program product, system, and method for determining whether a selected backup image satisfies a retention policy.

2. Description of the Related Art

A storage management application, such as IBM* Tivoli* Storage Manager (TSM), may be implemented on a storage management server. The storage management application may manage storage requirements for a plurality of client nodes that are coupled to the storage management server via a network. (IBM and Tivoli are registered trademarks of International Business Machines Corp. in the United States and other countries).

The storage management application may create and manage a repository for backup images. A backup image stores files needed to recover a state of a machine, including the current operating state of the machine, data, programs, and configuration settings, that are backed up, archived, migrated, or otherwise copied from the client nodes to the storage management server. The recovery of a backup image at a client node allows the client to operate with the state of the machine represented in the image. The storage management server may store machine components, such as programs, files, configuration settings, in one or more storage pools and may use a database stored in the storage management server for tracking information about the stored machine components.

The storage management application may perform incremental backup, incremental archiving, migration, or incremental copying of images from the client nodes to the storage management server. For example, if the storage management application comprises a backup application then the backup application may perform incremental backup operations in which image components are backed up only if the files have changed since a previous, periodic full backup, where the periodic full backups may be made on a weekly, monthly or some other periodic basis.

A Bare Machine Recovery (BMR) is defined as the ability to execute a recovery operation on a computer without using the operating system that is currently loaded on the computer. BMRs are performed from full or incremental backups. However, a selected backup image may not be useful and may have problems or errors that will prevent a successful restoration.

There is a need in the art to assess the suitability of a selected backup image and the likelihood of success of a recovery operation using a selected backup image.

SUMMARY

Provided are computer program product, system, and method for assessing a backup image comprising a backup of a source computer system to recover to a target computer system. A point-in-time backup image is selected from a plurality of backup images taken of an image on the source computer system, wherein the selected backup is to be applied to the target computer system. A determination is made from a plurality of retention policies applicable to files included in the source computer system a most restrictive retention policy. A determination is made as to whether the selected backup image satisfies the most restrictive retention policy. A retention status of the backup image is set based on whether the determined version of the selected backup satisfies the most restrictive retention policy. The retention status is presented for use in determining whether to use the selected backup image.

DETAILED DESCRIPTION

Described embodiments provide techniques to determine whether files in a backup image satisfy retention policies applicable to the files in the backup image. To avoid having to consider whether every file in a selected backup image to recover satisfies every applicable retention policy, described embodiments determine a most restrictive retention policy and then determine a retention unit applicable to the backup image, such as an estimated maximum version number for all files in the backup image, and determines whether the backup image retention unit satisfies the most restrictive retention policy applicable to the files in the backup image. Users of the recovery program may then assess the suitability of a backup file based on the assessment value of a selected backup image according to retention policies applicable to files in the backup image.

Figure 1:
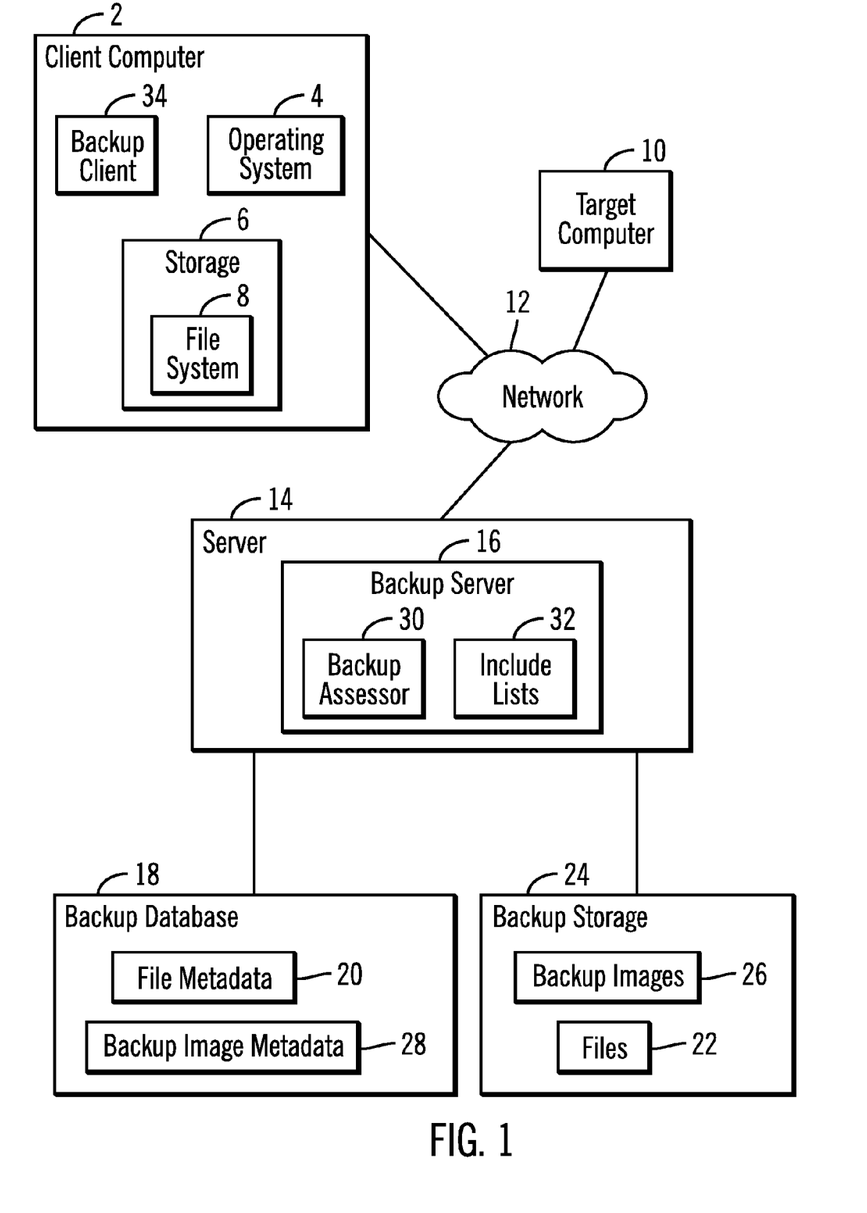
FIG. 1 illustrates an embodiment of a backup computing environment.

FIG. 1 illustrates an embodiment of a network computing environment. A client computer 2 comprises a computer system including an operating system 4, a storage 6, and a file system 8 having files, drivers, library files, programs, and data used by the client 2. One client computer may comprise a target computer 10 to which an image of the client computer 2, including the operating system 4 and file system 8, may be copied to replicate the client computer 2 at the target computer 10. There may be multiple client computers 2 in the network 12.

The client computers 2 and target computer 10 communicate with a server 14 over the network 12. The server 14 includes a backup server 16 program to backup or archive client files in the file system 8 and to create backup images of the client computer 2 system, including machine components such as the operating system 4 and file system 8 to allow the operating environment of the client computer 2 to be recovered to another target computer 10 or the client computer 2.

The backup server 16 stores in a backup database 18 file metadata 20 having information on client files 22 stored in a backup storage 24 that are stored separately in the backup storage 24 from any backup images 26 that may include the files 22. The backup server 16 maintains backup image metadata 28 having information on the backup images 26 in the backup storage 24. There is one instance of file metadata 20 and backup image metadata 28 for each file 22 and backup image 26, respectively, maintained for each client node. Each backup image 26 may provide an image of a client computer 2 as of a point-in-time, including files needed to recover a computer to a previous state. There may be multiple backup images 26 for one client computer 2, such that one of the backup images comprises a full backup of the client computer 2 image and other later taken backup images comprise incremental backups of the client computer 2 image, providing changes between the previous backup images and the current point-in-time of the incremental backup.

When restoring a computer as of a point-in-time from one of the backup images 2, the backup server 16 accesses most recent versions of files 22 indicated in the selected backup image, all previous incremental backup images, and the full backup image to recover. In a progressive incremental backup, if the client wants to recover a point-in-time, the backup server 16 is responsible for sorting out the files which would satisfy the desired point-in-time so that the client does not need to understand or select when the full and various incremental backups were taken.

The backup server 16 includes a backup assessor 30 component that assesses the likelihood of a successful recovery operation from a selected backup image 26 by considering various factors. The backup server 16 further maintains one or more include lists 32, where each include list 32 provides the critical files and recovery metadata that are required to be included in a backup image for a successful recovery operation.

The client 2 may further include a backup client 34 program to transfer copies of the client 2 image and client files in the client file system 8 over the network 12 to the backup server 6.

The client computers 2 and target computer 10 that communicate with the backup server 16 may comprise suitable computational devices known in the art, such as servers, desktop computers, workstations, mainframes, hand held computing devices, telephony devices, etc. There may be multiple instances of the client computer 2. The client storage 6 may comprise a primary storage device used by a client 2, such as one or more hard disk drives, solid state storage devices (SSDs), etc. The backup storage 24 may comprise storage comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, solid state storage devices (SSDs), storage-class memory (SCM)), electronic memory, magnetic tape media, tape cartridges, etc.

The network 12 may comprise a Wide Area Network (WAN), Local Area Network (LAN), Storage Area Network (SAN), wireless network, the Internet, an Intranet, peer-to-peer network, etc. The backup database 18 may comprise a relational database or other suitable database known in the art The backup client 34 and backup server 6 may comprise programs included with a client-server backup program, such as the IBM™ Tivoli™ Storage Manager (TSM) backup manager or client-server backup programs offered by different computer vendors. Further, in certain embodiments, the client backup programs and backup server 16 may be implemented in the client machines so that the clients write backup images directly to the backup storage 24 without the need for the server 14.

Figure 2:
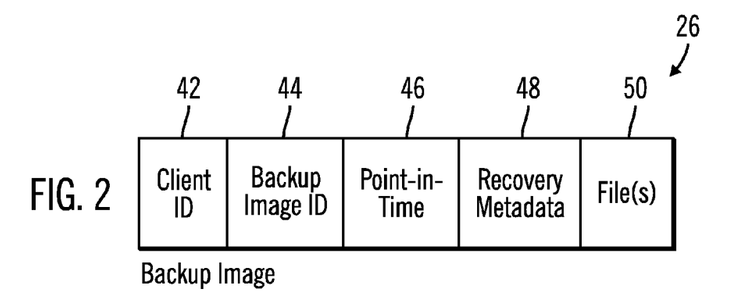
FIG. 2 illustrates an embodiment of a backup image.

FIG. 2 illustrates an embodiment of an instance of one backup image 26 as including: client identification (ID) 42 identifying the client whose image is included in the backup image 26; a backup image identifier (ID) 44; a point-in-time timestamp 46 of the date and time the backup image was created; recovery metadata 48 having information on the client computer 2 required to recover the image, such as the partition layout, storage required, machine hostnames, etc.; and information indicating the files 50 included in the backup image 20, such as a file identifier. In this way, the backup image 26 provides a definition of the files included in the image taken from the client computer 2.

Figure 3:
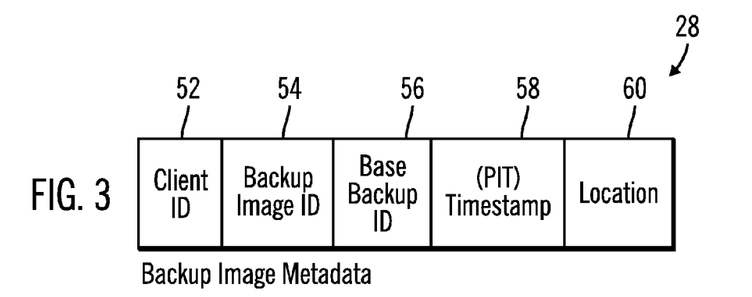
FIG. 3 illustrates an embodiment of a backup image metadata.

FIG. 3 illustrates an embodiment of an instance of backup image metadata 28 maintained in the backup database 18 for each backup image 26, including: client ID information 52 identifying the client computer 2 whose image, e.g., operating system 4 and file system 8, is included in the backup image 26; a backup image identifier (ID) 54; a base backup image ID 56 identifying the backup image having the full backup of the client 52 if the backup image 54 is an incremental backup image for the full backup image; a point-in-time timestamp 58 of the date and time the backup image was created; and a location 60 of the backup image 54 in the backup storage 24.

Figure 4:
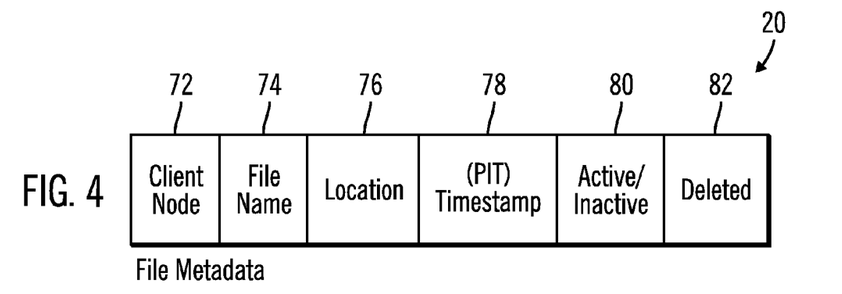
FIG. 4 illustrates an embodiment of file metadata.

FIG. 4 illustrates an embodiment of an instance of file metadata 20 maintained in the backup database 18 having information on a client file 22 stored external to the backup images. In this way, a client file 22 may be stored external in the backup storage 24 to any backup image 26 and indication of the file may be stored within a backup image 26. Further, a file 22 stored separately in the backup storage 24 may be expired before the backup image including the expired file is expired. An instance of file metadata 20 as shown in FIG. 4 may include: client node 72 identifying the client computer 2 from which the file originated; a file name 74; a location 76 of the file 22 in the backup storage 24; a point-in-time (PIT) timestamp 28 for the file when it was created or last modified; an active/inactive field 80 indicating whether the file is active or inactive; and a deleted field 82 indicating whether the file was deleted from the client 2.

Figure 5:
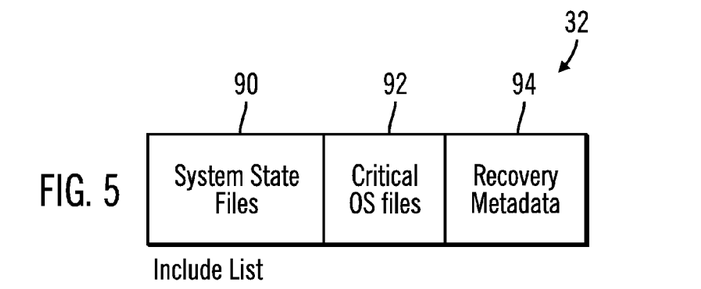
FIG. 5 illustrates an embodiment of an include list.

FIG. 5 illustrates an embodiment of an include list 32 indicating critical files and recovery metadata that should be included in the backup image for a successful recovery operation, including system state files 90, such as files required by the operating system; critical operating system files 92 necessary to define the operating system 4 such that the target computer 10 on which the image is recovered may be booted and execute; and recovery metadata 94. The critical operating system files 92 indicated in the include lists 32 may be platform dependent, such that the files differ for different operating systems. The critical files 92 may further include critical user data. The recovery metadata 94 provides information about the source machine, such as the partition layout, file system definitions, backup connection information, hostnames, information on files, disk space, computational resources.

For instance, the critical files for a Microsoft® Windows® BMR operating system recovery would include the system state files such as the Registry, COM+ Class Registration database, Boot files, including the system files, Certificate Services database, Active Directory directory service, SYSVOL directory, Cluster service information, IIS Metadirectory, System files that are under Windows File Protection. Restoring the System State, along with the primary drive (e.g.: C:\) have been found to be sufficient for a Windows operating system recovery. (Microsoft and Windows are registered trademarks of Microsoft Corp. in the United States and foreign countries).

For UNIX platforms, the critical files may include the files in the file systems at the locations: /. /usr; /opt; /export/home; and /export/install. (UNIX is a trademark or registered trademark of The Open Group.).

Thus, different include lists 32 for different operating systems, different versions of similar operating systems or client images may be maintained.

Figure 6:
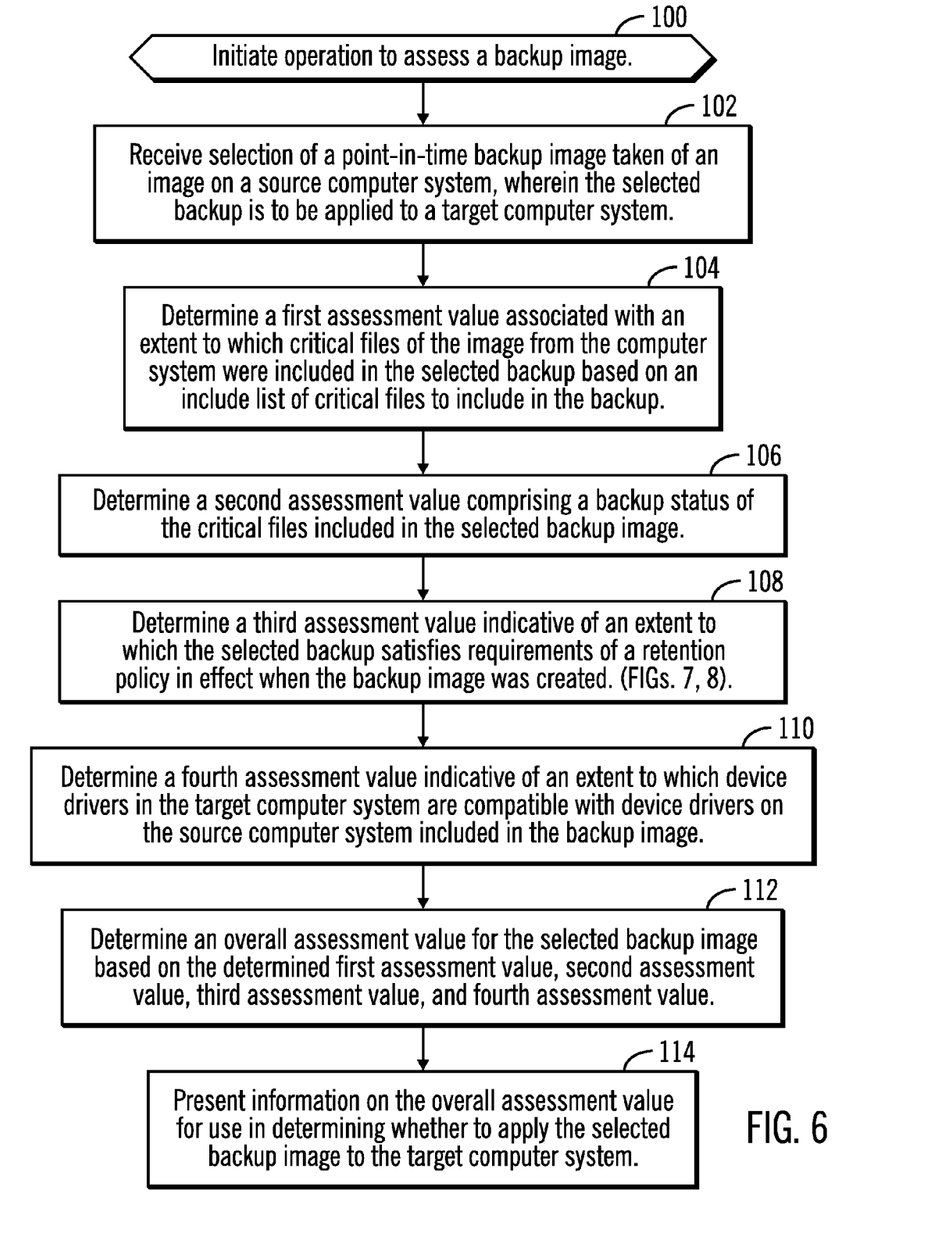
FIG. 6 illustrates an overview of operations to assess a backup image.

FIG. 6 illustrates an embodiment of operations performed by the backup assessor 30 to determine an assessment value or score describing the likelihood that a user selected backup image 26 will result in a successful recovery of an image of a client computer, including the operating system 4 and file system 8, to a target computer 10. Upon initiating the assessment operation (at block 100), the backup assessor 30 receives (at block 102) selection of a point-in-time backup image 26 taken of an image on a source computer system, comprising one of the client computer 2, wherein the selected backup is to be applied to a target computer system 10. The backup assessor 30 determines (at block 104) a first assessment value associated with an extent to which critical files and metadata of the image from the computer system were included in the selected backup image 26 based on the include list 32 relevant to the image being recovered. The backup assessor 30 determines (at block 106) a second assessment value comprising a backup status of the critical files and recovery metadata included in the selected backup image.

Figure 7:
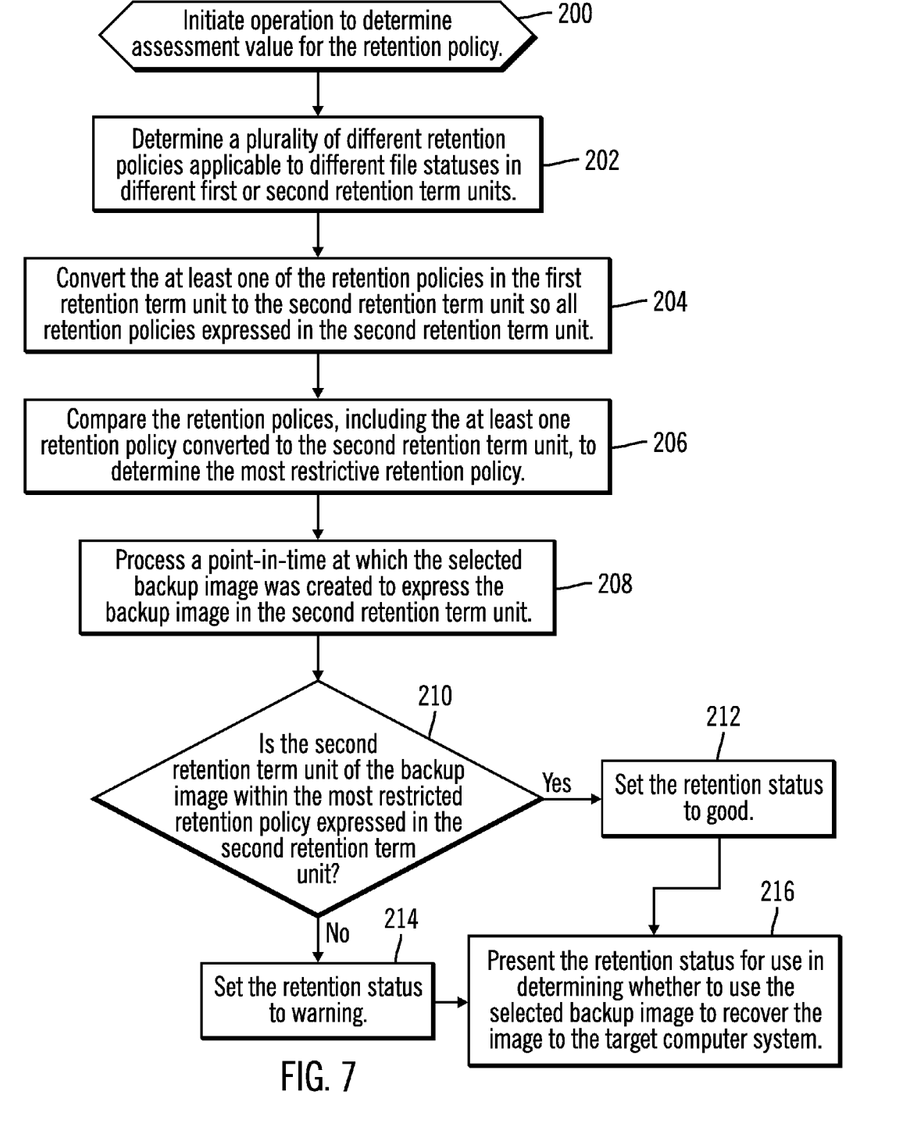
FIGS. 7 and 8 illustrate embodiments of operations to assess whether a backup image satisfies one or more retention policies applicable to the files included in the backup image.
Figure 8:
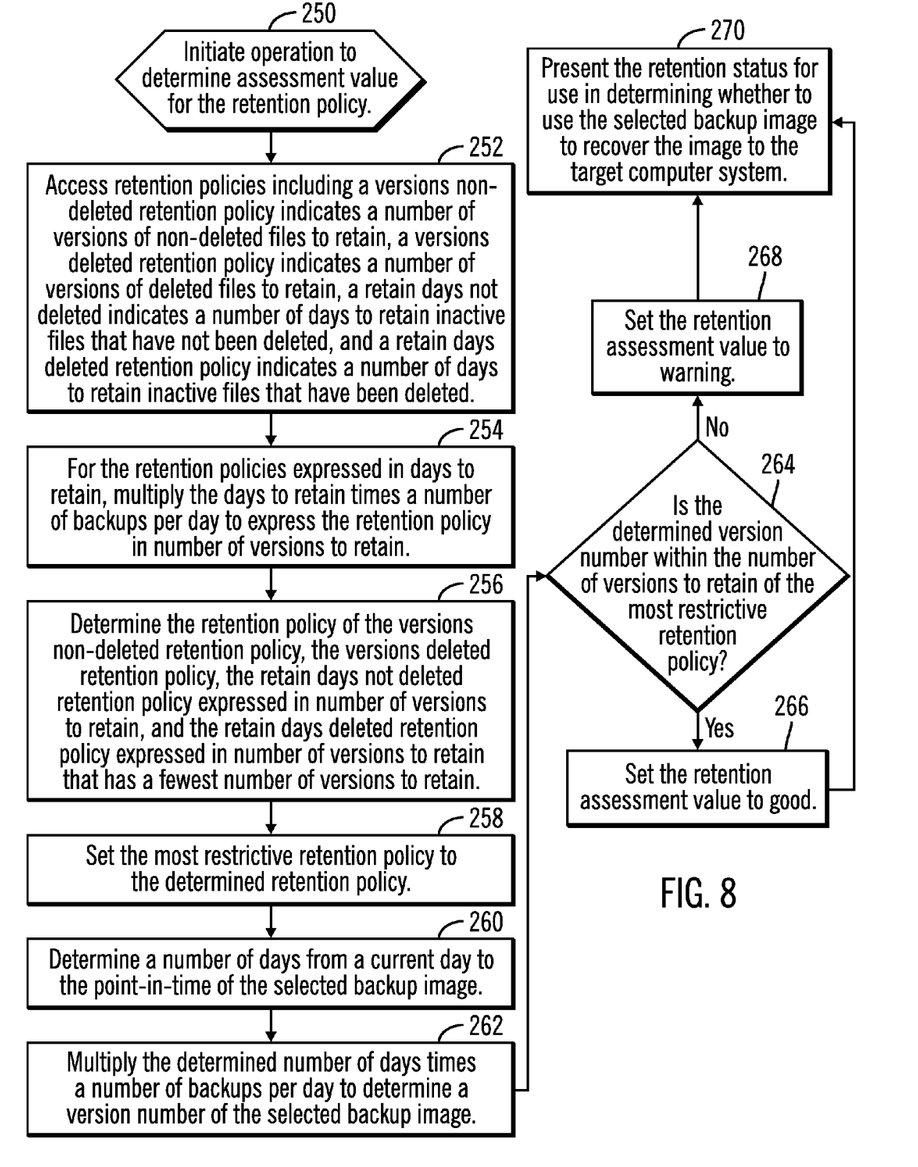

The backup assessor 30 determines (at block 108) a third assessment value indicative of an extent to which the files in the selected backup images satisfies requirements of one or more retention policies applicable to the backup image 26 when the backup image was created. FIGS. 7 and 8 provides further details on operations to determine the third assessment value. The backup assessor 30 further determines (at block 110) a fourth assessment value indicative of an extent to which device drivers in the target computer system 10 are compatible with device drivers on the source computer system whose image is represented in the backup image 26.

The backup assessor 30 then determines (at block 112) an overall assessment value for the selected backup image based on the determined first assessment value, second assessment value, third assessment value, and fourth assessment value. This overall assessment value may indicate that the selected backup image is good, a warning or fail. The backup assessor 30 presents (at block 114) information on the overall assessment value to the user invoking the backup assessor 30 for the selected backup image 26 to use to ascertain whether to apply the selected backup image to the target computer system 10. If the presented information indicates a warning or fail status for the backup image 26, then additional information may be provided such as the files that are missing or problems that resulted in the warning or fail status. The user may then determine whether to proceed with the selected backup image 26 to recover the image represented by the selected backup image 26 to the target computer 10 or select another backup image to assess as a candidate for recovery.

In further embodiments, the backup assessor 30 may also provide meaningful information to the user, not just a backup assessment value, such as information on how to change policy or processes so that a better assessment can be achieved for future backups. For example, if the assessment indicated that files were missing because of a policy setting that dictated that files are only kept for 15 days but the user is trying to recover to a point-in-time that is 30 days old, the assessment information may instruct the user how to change the policy setting(s) such that the individual files can be retained for at least 30 days for future backups.

Further details on how to determine the overall assessment value based on the first, second, third and fourth assessment values is disclosed in the commonly assigned patent application titled "DETERMINING AN OVERALL ASSESSMENT OF A LIKELIHOOD OF A BACKUP IMAGE RESULTING IN A SUCCESSFUL MACHINE RECOVERY", by Surya K. GHATTY, James P. SMITH, Peter B. SYMONDS, and William R. YONKER, having Ser. No. 13/333,297, filed on the same date hereof, which patent application is incorporated herein by reference in its entirety.

FIG. 7 illustrates an embodiment of operations performed by the backup assessor 30 to determine the third assessment value based on an estimation of whether files in the selected backup image 26 satisfy file retention policies applicable to the files in the source client computer 2 being backed-up. File retention policies may indicate a number of days and/or number of versions to maintain for active files, inactive files, deleted files and/or non-deleted files. The purpose of the third assessment is to determine whether the files present at the time of the backup comply with retention policies applicable to source computer system 2 subject to the backup. To the extent the backed-up files do not comply with the retention policy, then this factor could reduce the likelihood of a successful recovery operation. Upon initiating (at block 200) the operation to determine the third assessment value related to retention policy compliance, the backup assessor 30 determines (at block 202) a plurality of different retention policies applicable to different file statuses, for files in the backup image, in different first or second retention term units. For instance, a first retention unit may express the retention policy in a "number of days to retain" a certain file, such as a deleted or non-deleted and/or inactive or inactive file, and a second retention unit may express the retention policy in a "number of versions" of a certain file type to maintain. The retention policy having the lowest value, i.e., fewest days to retain or fewest number of versions requirement would be the most restrictive policy.

To compare retention policies in different retention units, e.g., days to retain, number of versions, the backup assessor 30 converts (at block 204) the at least one of the retention policies in the first retention term unit to the second retention term unit so all retention policies are expressed in the second retention term unit for comparison purposes. For instance, to convert a retention policy expressed in "days to retain" to "number of versions to retain", the "days to retain" may be multiplied by a number of backups per day to express the "days to retain" as a number of versions. Similarly, to covert a retention policy expressed in "number of versions" to retain to "days to retain" to, the "number of versions to retain" may be divided by a number of backups per day to express the "number of versions to retain" as a number of days.

The backup assessor 30 compares (at block 206) the retention polices, including the retention policy converted to the common second retention term unit, to determine the most restrictive retention policy, i.e., the retention policy having the least number of "days to retain" or least number of "versions to retain". The backup assessor 30 further processes (at block 208) a point-in-time 58 at which the selected backup image 26 was created to express the backup image 26 in the second retention term unit, such as the version number. This value estimates a maximum number of revisions or days for each file in the backup image 26. The backup assessor 30 determines (at block 210) whether the second retention term unit of the backup image, i.e., version number, days retained, is within the most restrictive retention policy expressed in the second retention term unit. If so, then the third assessment value is set (at block 212) to good because no file could not have satisfied the retention period requirement because the backup image 26 expressed in the retention term unit comprises a maximum number of versions or days for each file in the backup image 26. If (at block 210) the backup image 26 expressed in terms of the second retention term unit does not satisfy the most restrictive retention policy, i.e., has a version number greater than the number of versions to retain or has existed for a number of days greater than the days to retain, then the third assessment value is set (at block 214) to warning. The backup assessor 30 then presents (at block 216) the retention status for use in determining whether to use the selected backup image 26 to recover the image to the target computer system 10.

FIG. 8 illustrates an additional embodiment of operations for determining whether files in a backup image 26 satisfy a plurality of retention policies. Upon initiating (at block 250) the operation to determine the retention policy assessment value, the backup assessor 30 accesses (at block 252) a plurality of retention policies in different retention term units, including (1) a versions non-deleted retention policy indicating a number of versions of non-deleted files to retain; (2) a versions deleted retention policy indicating a number of versions of deleted files to retain; (3) a retain days not deleted indicates a number of days to retain inactive files that have not been deleted; and (4) a retain days deleted retention policy indicates a number of days to retain inactive files that have been deleted. For the retention policies expressed in days to retain, the backup assessor 30 multiplies (at block 254) the days to retain times a number of backups per day to express the retention policy in number of versions to retain. In this way, the maximum number of versions that could be created during the retention time is estimated.

The backup assessor 30 then determines (at block 256) the retention policy of the versions non-deleted retention policy, the versions deleted retention policy, the retain days not deleted retention policy expressed in number of versions to retain, and the retain days deleted retention policy expressed in number of versions to retain that has a fewest number of versions to retain, i.e., the most restrictive policy. The most restrictive retention policy is then set (at block 258) to this determined retention policy. In certain embodiments, there may be a different set of retention policies for different management classes. There may be different management classes for different types of groups of files in the source computer 2. In such embodiments, the backup assessor 30 may then determine the most restrictive retention policy for each management class and then determines a most restrictive retention policy of the most restrictive policies for the different classes. In this way, the backup assessor 30 uses a most restrictive policy across all management classes for all files to ensure that all files will pass the most restrictive retention policy that could apply. This saves computational time by avoiding have to check whether each file satisfies every possible applicable retention policy by determining a most restrictive policy to apply to all files.

The backup assessor 30 determines (at block 260) a number of days from a current day to the point-in-time 46 of the selected backup image. The determined number of days is multiplied (at block 262) times a number of backups per day to determine a version number of the selected backup image. This version number is the estimated maximum number of versions that could have been generated for each file since the selected backup image was created. For instance, if the selected backup image is ten days old and two backup images are created a day, then at most there can be 20 backup images or version of files since the backup image was created, meaning that the selected backup image is the $20^{th}$ version prior to the current date.

The backup assessor 30 determines (at block 264) whether the determined version number for the backup image is within the number of versions to retain of the most restrictive retention policy. If the determined version number is within the maximum number of versions to retain according to the most restrictive policy, then the retention assessment value is set (at block 266) to good, otherwise, the retention assessment value is set (at block 268) to warning. The backup assessor 30 presents (at block 270) the retention status for use in determining whether to use the selected backup image to recover the image to the target computer system. The determined retention status may be presented as a standalone value or used in combination with other factors as in FIG. 6 to determine an overall assessment value of the backup image.

Determining whether a selected backup image satisfies a most restrictive retention policy allows a further estimation as to whether the restoration of the selected backup is likely to succeed because a backup image having files that satisfy the retention policy requirements have a greater likelihood of restoring the target computer system 10 to an operational state. The described operations use an estimation technique assuming that the maximum number of revisions that could have occurred within the backup image based on an age of the backup image and the number of back-ups per day without having to consider individually whether each file in the backup image satisfies each retention policy requirement, which could be very computationally expensive. In an alternative embodiment, the assessment of the retention policy compliance may be performed by considering whether each file in the selected backup image, and files in the incremental and full backups, satisfies the retention policies applicable to the source client computer system.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 9:
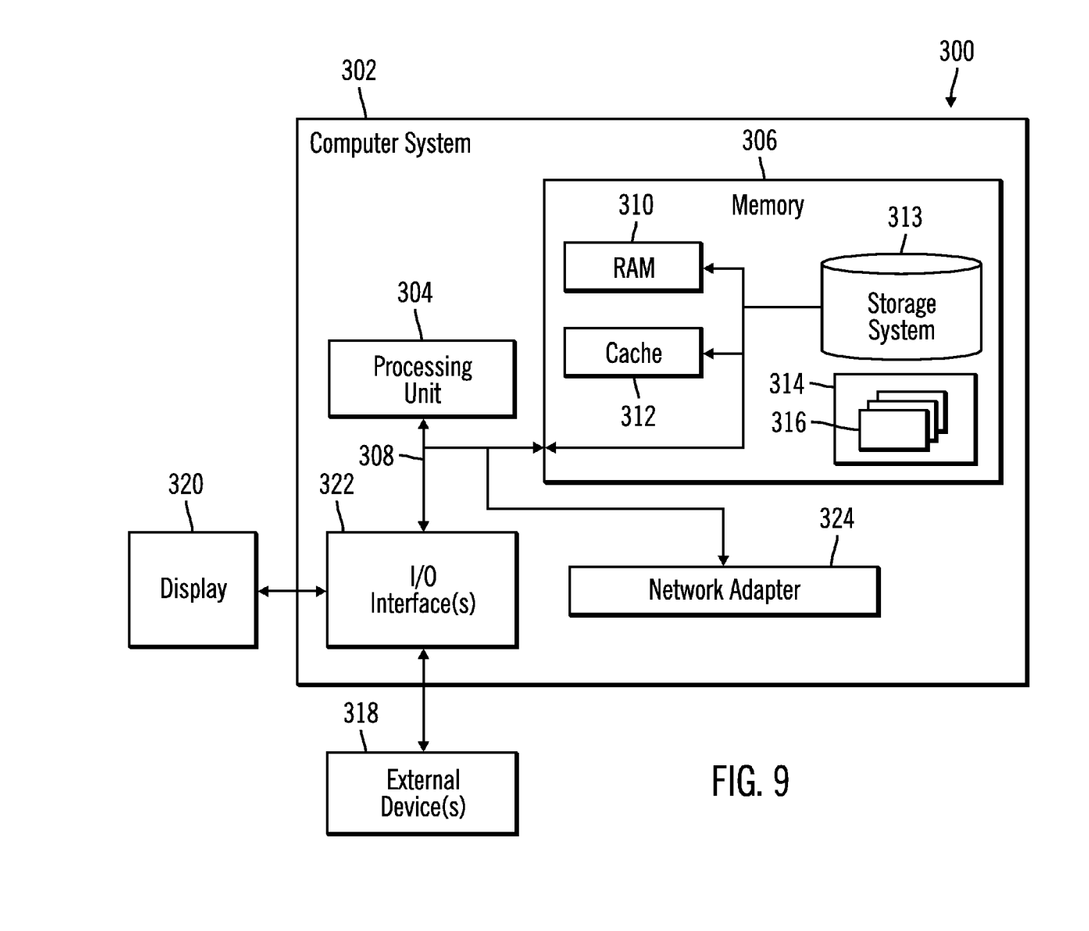
FIG. 9 illustrates an embodiment of a computing environment.

The program components of the computer 2, server 14, and target computer 10 may be implemented as one or more program modules in one or more computer systems, such as the computer system 302 shown in FIG. 9. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The components of the backup server 16, the backup database 18, and the backup storage 24 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for assessing a backup image comprising a backup of a source computer system to recover to a target computer system, wherein the computer program product comprises a computer readable storage medium having computer readable program code embodied therein that executes to perform operations, the operations comprising:
   selecting a backup image from a plurality of backup images taken of an image on the source computer system, wherein the selected backup image is to be applied to the target computer system;
   determining from a plurality of retention policies applicable to files included in the source computer system a most restrictive retention policy based on a comparison of the retention policies according to a common retention term unit;
   determining whether the selected backup image satisfies the most restrictive retention policy;
   setting a retention status of the selected backup image based on whether the selected backup image satisfies the most restrictive retention policy; and
   presenting the retention status for use in determining whether to use the selected backup image.

2. The computer program product of claim 1, wherein the setting of the retention status comprises:
   setting the retention status to good in response to determining that the selected backup image satisfies the most restrictive retention policy; and
   setting the retention status to warning in response to determining that the selected backup image does not satisfy the most restrictive retention policy.

3. The computer program product of claim 1, wherein the determining the most restrictive retention policy comprises:
   determining a plurality of different retention policies applicable to different file statuses for files in the selected backup image, wherein the most restrictive retention policy comprises the most restrictive of the different retention policies applicable to the different file statuses.

4. The computer program product of claim 3, wherein the different file statuses to which the retention policies are applicable comprise inactive, active, deleted and not deleted.

5. The computer program product of claim 1, wherein the determining the most restrictive retention policy comprises:
   determining a plurality of retention policies, wherein at least one of the retention policies is expressed in a first retention term unit and at least one of the retention term policies is expressed in a second retention term unit, wherein the first and second retention term units are different;

converting the at least one of the retention policies in the first retention term unit to the second retention term unit, wherein all the retention policies are in the second retention term unit after the conversion; and comparing the retention polices, including the at least one retention policy converted to the second retention term unit, to determine the most restrictive retention policy in terms of the second retention term unit.

6. The computer program product of claim 5, wherein the operations further comprise:

processing a point-in-time at which the selected backup image was created to express the selected backup image in the second retention term unit, wherein determining whether the selected backup image satisfies the most restrictive retention policy comprises determining whether the second retention term unit of the selected backup image is within the most restrictive retention policy expressed in the second retention term unit.

7. The computer program product of claim 5, wherein the first and second retention term units comprise one of days to retain and versions to retain.

8. The computer program product of claim 7, wherein the first retention term unit comprises days to retain and wherein converting the at least one retention policy expressed in days to retain comprises:

for each of the at least one retention policy expressed in days to retain, multiplying the days to retain times a number of backups per day to express the retention policy in number of versions to retain.

9. The computer program product of claim 8, wherein the operations further comprise:

processing a point-in-time at which the selected backup image was created to determine a version number of the selected backup image, wherein determining whether the selected backup image satisfies the most restrictive retention policy comprises determining whether the determined version number of the selected backup image is less than the number of versions to retain of the maximum retention policy.

10. The computer program product of claim 1, wherein the retention policies include a versions non-deleted retention policy which indicates a number of versions of non-deleted files to retain, a versions deleted retention policy which indicates a number of versions of deleted files to retain, a retain days not deleted retention policy which indicates a number of days to retain inactive files that have not been deleted, and a retain days deleted retention policy which indicates a number of days to retain inactive files that have been deleted, wherein the operations further comprise:

processing the retain days deleted and retain days non-deleted retention policies to express the retain days retention policies in number of versions to retain, wherein the most restrictive retention policy comprises the retention policy of the versions non-deleted retention policy, the versions deleted retention policy, the retain days not deleted retention policy expressed in number of versions to retain, and the retain days deleted retention policy expressed in number of versions to retain that has a fewest number of versions to retain; and processing a point-in-time at which the selected backup image was created to determine a number of days from a current day to the point-in-time of the selected backup image;

multiplying the number of days times a number of backups per day to determine a version number of the selected backup image, wherein the selected backup image satisfies the most restrictive retention policy if the determined version number of the selected backup image is less than the number of versions to retain of the most restrictive retention policy.

11. A method for assessing a backup image comprising a backup of a source computer system to recover to a target computer system, comprising:

selecting a backup image from a plurality of backup images taken of an image on the source computer system, wherein the selected backup image is to be applied to the target computer system;

determining from a plurality of retention policies applicable to files included in the source computer system a most restrictive retention policy;

determining whether the selected backup image satisfies the most restrictive retention policy based on a comparison of the retention policies according to a common retention term unit;

setting a retention status of the selected backup image based on whether the determined version of the selected backup image satisfies the most restrictive retention policy; and presenting the retention status for use in determining whether to use the selected backup image.

12. The method of claim 11, wherein the setting of the retention status comprises:

setting the retention status to good in response to determining that the selected backup image satisfies the most restrictive retention policy; and setting the retention status to warning in response to determining that the selected backup image does not satisfy the most restrictive retention policy.

13. The method of claim 11, wherein the determining the most restrictive retention policy comprises:

determining a plurality of different retention policies applicable to different file statuses for files in the selected backup image, wherein the most restrictive retention policy comprises the most restrictive of the different retention policies applicable to the different file statuses.

14. The method of claim 11, wherein the determining the most restrictive retention policy comprises:

determining a plurality of retention policies, wherein at least one of the retention policies is expressed in a first retention term unit and at least one of the retention term policies is expressed in a second retention term unit, wherein the first and second retention term units are different;

converting the at least one of the retention policies in the first retention term unit to the second retention term unit, wherein all the retention policies are in the second retention term unit after the conversion; and comparing the retention polices, including the at least one retention policy converted to the second retention term unit, to determine the most restrictive retention policy in terms of the second retention term unit.

15. The method of claim 14, wherein the operations further comprise:

processing a point-in-time at which the selected backup image was created to express the selected backup image in the second retention term unit, wherein determining whether the selected backup image satisfies the most restrictive retention policy comprises determining whether the second retention term unit of the selected backup image is within the most restrictive retention policy expressed in the second retention term unit.

16. The method of claim 14, wherein the first and second retention term units comprise one of days to retain and versions to retain.

17. The method of claim 16, wherein the first retention term unit comprises days to retain and wherein converting the at least one retention policy expressed in days to retain comprises:
for each of the at least one retention policy expressed in days to retain, multiplying the days to retain times a number of backups per day to express the retention policy in number of versions to retain.

18. A system for assessing a backup image comprising a backup of a source computer system to recover to a target computer system, comprising:
a processor; and
a computer readable storage medium including program code executed by the processor to perform operations, the operations comprising:
selecting a backup image from a plurality of backup images taken of an image on the source computer system, wherein the selected backup image is to be applied to the target computer system;
determining from a plurality of retention policies applicable to files included in the source computer system a most restrictive retention policy based on a comparison of the retention policies according to a common retention term unit;
determining whether the selected backup image satisfies the most restrictive retention policy;
setting a retention status of the selected backup image based on whether the determined version of the selected backup image satisfies the most restrictive retention policy; and
presenting the retention status for use in determining whether to use the selected backup image.

19. The system of claim 18, wherein the setting of the retention status comprises:
setting the retention status to good in response to determining that the selected backup image satisfies the most restrictive retention policy; and
setting the retention status to warning in response to determining that the selected backup image does not satisfy the most restrictive retention policy.

20. The system of claim 18, wherein the determining the most restrictive retention policy comprises:
determining a plurality of different retention policies applicable to different file statuses for files in the selected backup image, wherein the most restrictive retention policy comprises the most restrictive of the different retention policies applicable to the different file statuses.

21. The system of claim 18, wherein the determining the most restrictive retention policy comprises:
determining a plurality of retention policies, wherein at least one of the retention policies is expressed in a first retention term unit and at least one of the retention term policies is expressed in a second retention term unit, wherein the first and second retention term units are different;
converting the at least one of the retention policies in the first retention term unit to the second retention term unit, wherein all the retention policies are in the second retention term unit after the conversion; and
comparing the retention polices, including the at least one retention policy converted to the second retention term unit, to determine the most restrictive retention policy in terms of the second retention term unit.

22. The system of claim 21, wherein the operations further comprise:
processing a point-in-time at which the selected backup image was created to express the selected backup image in the second retention term unit, wherein determining whether the selected backup image satisfies the most restrictive retention policy comprises determining whether the second retention term unit of the selected backup image is within the most restrictive retention policy expressed in the second retention term unit.

23. The system of claim 21, wherein the first and second retention term units comprise one of days to retain and versions to retain.

24. The system of claim 23, wherein the first retention term unit comprises days to retain and wherein converting the at least one retention policy expressed in days to retain comprises:
for each of the at least one retention policy expressed in days to retain, multiplying the days to retain times a number of backups per day to express the retention policy in number of versions to retain.

* * * * *